April 29, 1941.  A. W. TONDREAU  2,240,083
FILM PRINTING APPARATUS
Filed Jan. 9, 1939  5 Sheets-Sheet 1

INVENTOR.
ALBERT W. TONDREAU
BY
ATTORNEY.

April 29, 1941. A. W. TONDREAU 2,240,083
FILM PRINTING APPARATUS
Filed Jan. 9, 1939 5 Sheets-Sheet 3
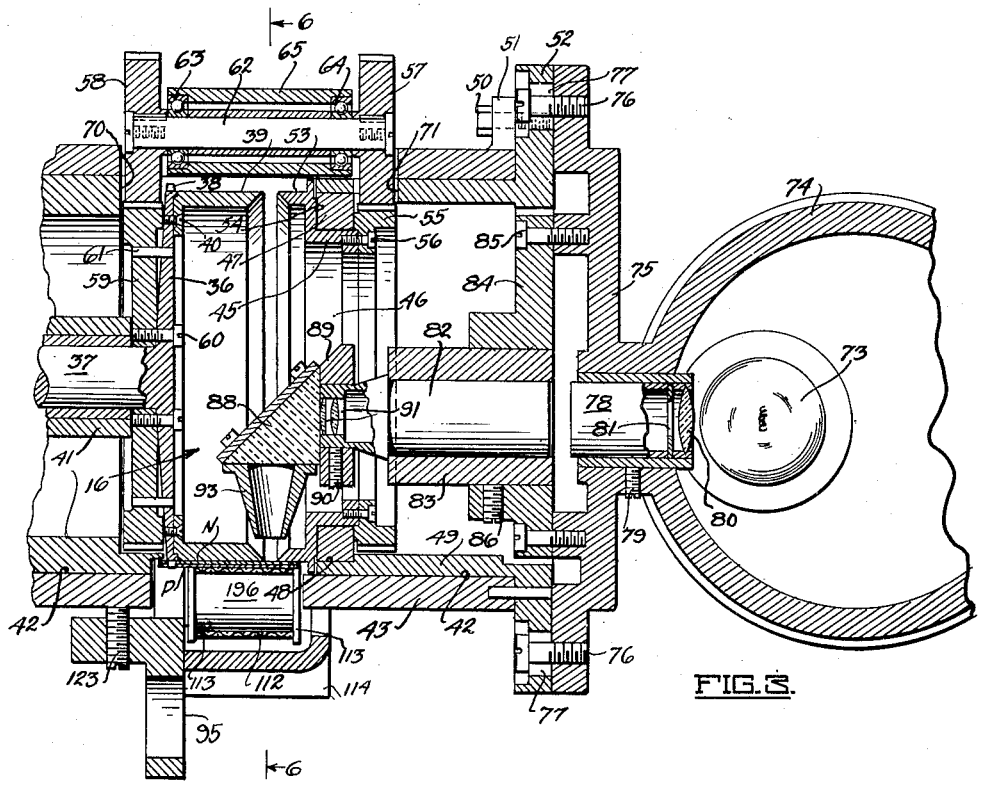
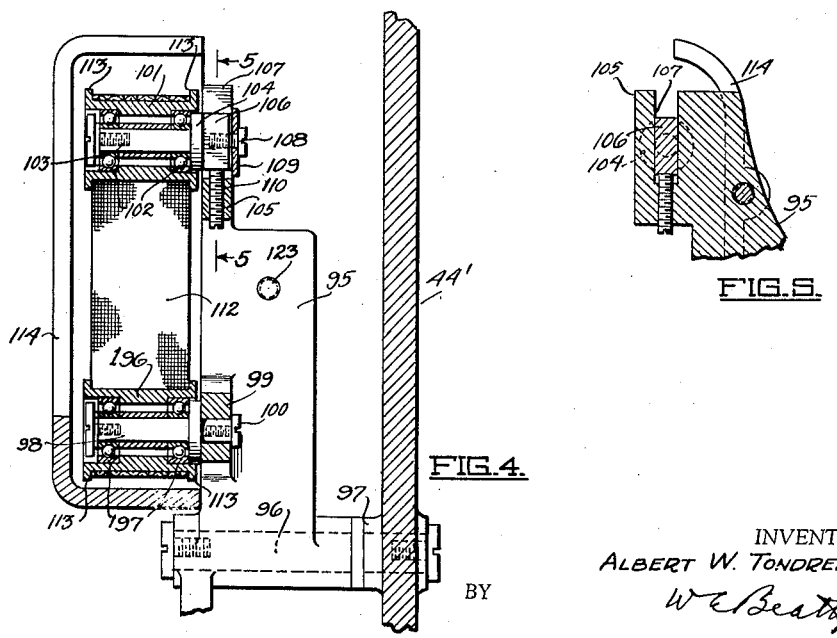
INVENTOR.
ALBERT W. TONDREAU
BY
ATTORNEY.

April 29, 1941.  A. W. TONDREAU  2,240,083
FILM PRINTING APPARATUS
Filed Jan. 9, 1939  5 Sheets-Sheet 5
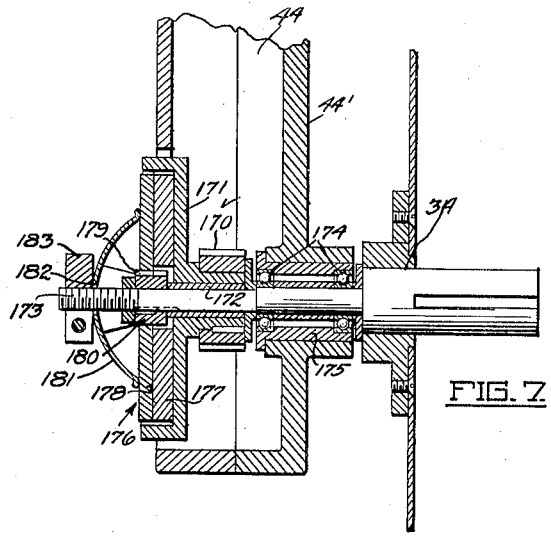
INVENTOR.
ALBERT W. TONDREAU
BY
W. E. Beatty
ATTORNEY.

Patented Apr. 29, 1941

2,240,083

UNITED STATES PATENT OFFICE 2,240,083

FILM PRINTING APPARATUS

Albert W. Tondreau, Hollywood, Calif., assignor to Warner Bros. Pictures, Inc., New York, N. Y., a corporation of Delaware Application January 9, 1939, Serial No. 249,956

12 Claims. (Cl. 95—75)

This invention relates to apparatus for printing elongated films of the motion picture type and has particular reference to apparatus for contact printing the sound track of motion picture films in a continuous manner.

One object of the invention is to obtain an intimate contact between films being printed at the printing point.

Another object of the invention is to prevent relative slippage of films being printed while passing in contact past the printing point.

Another object of the invention is to utilize the adjacent edges of a pair of spaced rotatable film guiding members to limit the width of a sound track being printed.

Another object is to prevent variations of speed in a film drive from being transmitted to films being printed while they are passing the printing point.

Another object is to facilitate removal and replacement of the parts of a film printing apparatus.

Another object is to permit a printer mechanism to be quickly started and stopped.

The manner in which the above and other objects of the invention are accomplished may be readily understood on reference to the following specification read in conjunction with the accompanying drawings wherein:

Fig. 3 is a sectional plan view through the printing chamber and is taken along the line 3—3 of Fig. 6.

Fig. 4 is a sectional view through the pad unit and is taken along the line 4—4 of Fig. 6.

Fig. 5 is a sectional view taken along the line 5—5 of Fig. 4.

Fig. 7 is a sectional view through one of the take-up reel drives and is taken along the line 7—7 of Fig. 2.

Fig. 8 is a transverse sectional view illustrating the motor clutch and is taken along the line 8—8 of Fig. 2.

Fig. 9 is a sectional view through the drive for the printing drum unit and is taken along the line 9—9 of Fig. 2.

Figure 1:
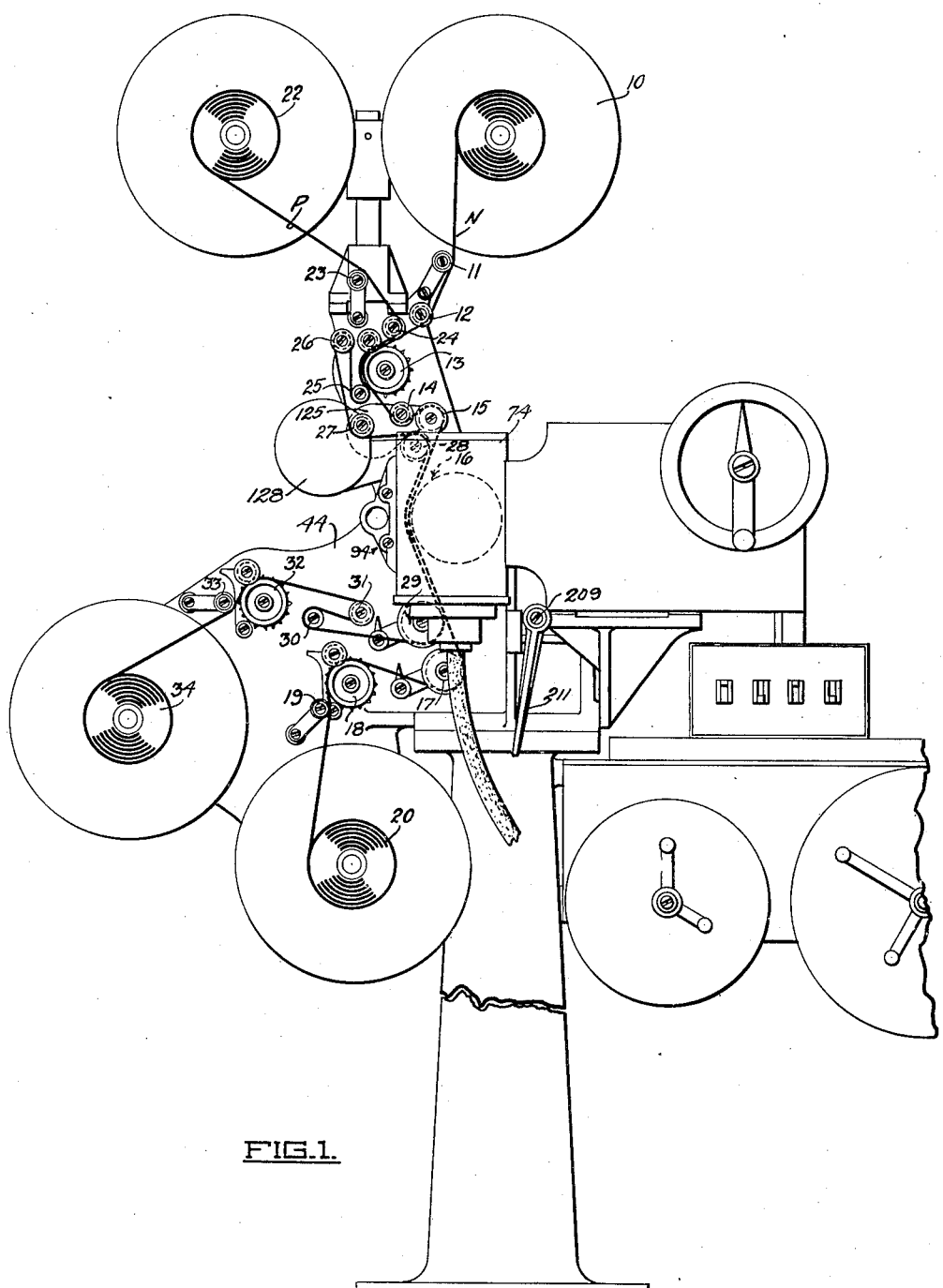
Fig. 1 is a side elevational view of a contact printing apparatus embodying the present invention.

Referring in particular to Fig. 1, the developed negative film N, having a sound track thereon, is fed from a supply reel 10 and passes over a guide roller 11, under a second guide roller 12 having edge guiding flanges thereon to guide the edges of the film, and thence passes in contact with a light sensitive positive film P onto a film feeding sprocket 13. Film N thence passes under a weighted roller 14, over a roller 15 having edge guiding flanges formed thereon, and thence passes over the periphery of a rotatable printing drum unit, generally indicated at 16, during which time the sound track of film N is printed onto the positive film P. From the drum unit 16, film N passes around a weighted roller 17 having edge guiding flanges thereon, over film hold-back sprocket 18, over a guide roller 19 and onto a take-up reel 20.

The positive film P is drawn from a supply reel 22 and passes over a guide roller 23, under a second guide roller 24 having edge guiding flanges thereon, and thence in contact with the film N while passing over the sprocket 13. Film P, after passing over the sprocket 13 is separated from film N and is led in a sinuous path around spaced rollers 25, 26, 27 and 28, the roller 27 being weighted. Roller 28 has edge guiding flanges thereon to accurately position the film transversely. From roller 28 the film P again passes in contact with the film N while passing over the printing drum unit 16 during the printing operation and is thereafter led around a weighted roller 29. The film is then led in a sinuous path around a roller 30, and a roller 31 having edge guiding flanges thereon. The film P is then drawn over a film hold-back sprocket 32, around a guide roller 33 and is rolled on a take-up reel 34. The various sprockets 13, 18 and 32, the drum unit 16, and the take-up reels 20 and 34 are all driven from a single motor in a manner hereinafter described.

It should be noted that the width of the sprocket teeth 38 is less than that of the sprocket perforations in the films. Thus the films are guided laterally over the drum unit by the respective edge guiding rollers 15, 17, 28 and 29.

Figure 6:
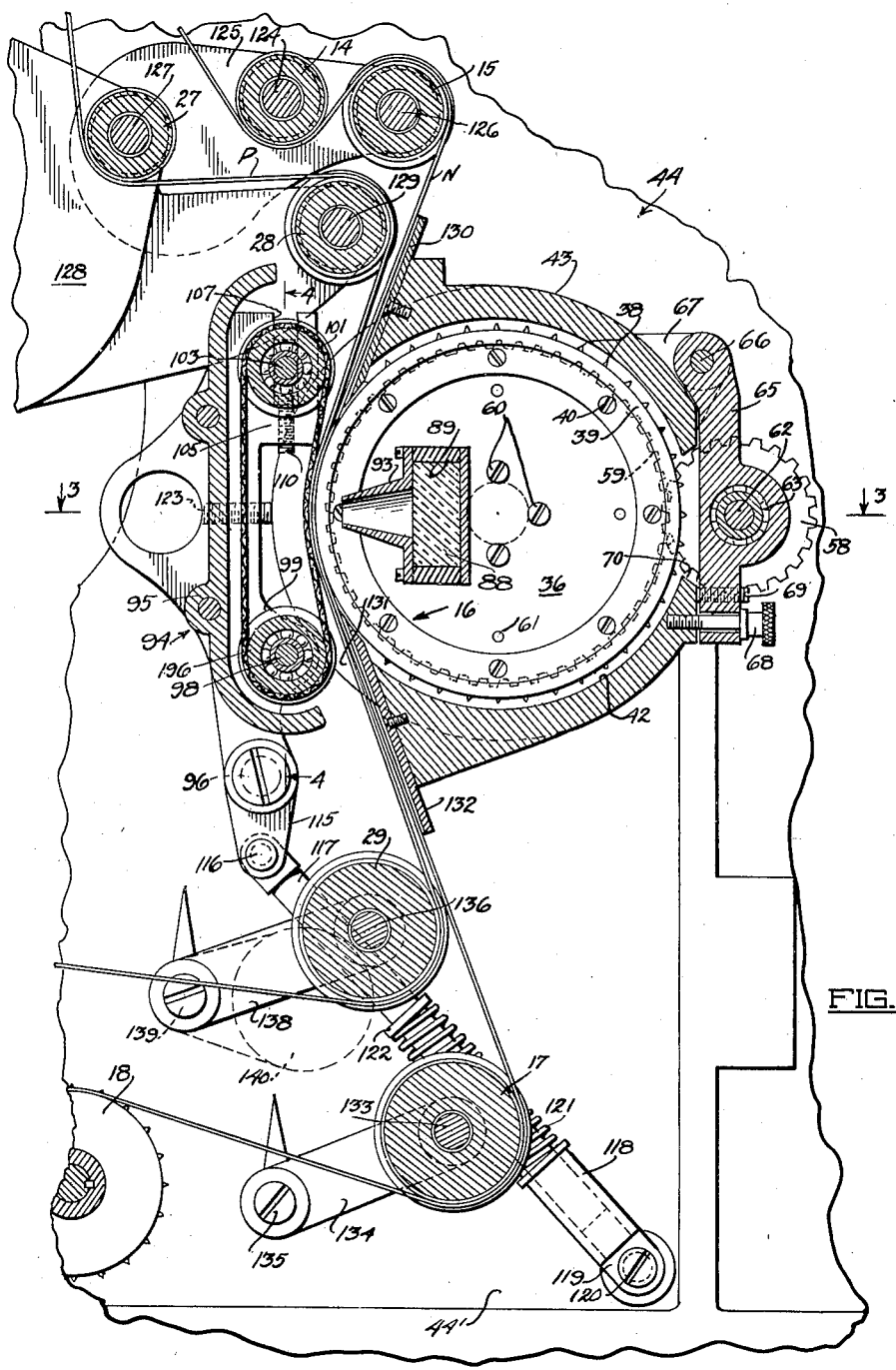
Fig. 6 is a sectional elevational view taken along the line 6—6 of Fig. 3.

Referring to Figs. 3 and 6, the printing drum unit 16 comprises a sprocket member 36 integrally formed on a shaft 37 and having sprocket teeth 38 thereon adapted to engage the sprocket perforations along one side of the two films N and P while passing thereover. Sprocket 36 has a cylindrical flange 39 secured thereto by bolts 40 to support the picture portions of the films traveling thereover. The right hand end of flange 39 (Fig. 3) is bevelled and is aligned with the edge of the sound track of film N directly adjacent the picture portion thereof and thus forms a mask for preventing exposure of a portion of the picture portion of film P while printing the sound track thereon from film N.

The shaft 37 is journalled in a bearing member 41 fitted in a bore 42 provided in a cylindrical protuberance 43 integrally formed on the printer casing 44.

The edges of the films N and P adjacent the sound track portion thereof are supported by an annular, or ring shaped film guiding member 45 having an opening 46 extending therethrough. Member 45 is journalled in a ring shaped bearing member 47 securely fitted in a counter bore 48 provided in a sleeve member 49. Sleeve member 49 is removably fitted in the bore 42 and is secured therein by bolts 50 extending through lugs 51 projecting from the cylindrical protuberance 43. Screws 50 are threaded in a circular flange 52 formed on the sleeve 49.

The film guiding surface 53 of ring 45 is of the same diameter as that of the flange 39 of sprocket member 36. The left hand edge of ring 45 is bevelled and is aligned with the left hand edge of the sound track to form a mask for limiting the width of the sound track. The ring 45 has a shoulder 54 formed thereon which engages one end of the bearing ring 47 to prevent longitudinal movement of ring 45 toward the sprocket member 36. An annular gear 55 is secured to the ring 45 by screws 56 on the opposite side of the ring 47 and has a shoulder formed thereon which engages the ring 47 to prevent longitudinal movement of the ring 45 while permitting rotation thereof.

The ring 45 is driven in synchronism with the sprocket member 36 by the train of gears 55, 57, 58 and 59. The gear 59 is secured to the sprocket member 36 by bolts 60 and dowel pins 61, and is of the same pitch diameter as the annular gear 55. The gears 57 and 58, meshing with the gears 55 and 59, respectively, are secured on opposite ends of a stub shaft 62, rotatably mounted in ball bearings 63 and 64 mounted in a bearing supporting member 65 (Fig. 6). Member 65 is pivoted at the upper end thereof on a pin 66 extending between brackets as at 67, projecting from the cylindrical protuberance 43. The lower end of member 65 is clamped in a position to mesh the gears 57 and 58 with their respective gears 55 and 59 by a locking screw 68 passing through member 65 and threaded in the cylindrical protuberance 43. A set screw 69 is threaded in member 65 and abuts the adjacent face of the protuberance 43 so as to permit adjustment of the member 65, and consequently the gears 57 and 58, to and from the respective gears 55 and 59 to correct for wear, etc. Gears 57 and 58 extend through an opening 70 formed in the protuberance 43. Gear 57 also extends through an opening 71 formed in the sleeve 49 co-extensive with opening 70.

The printing light is obtained from a lamp 73 suitably mounted in an enclosed lamp house 74 which is formed integral with an end cover 75. Cover 75 is secured to the flange 52 of sleeve 49 by screws 76 which extend through elongated slots 77 in flange 52 and are threaded in the end cover 75. Slots 77 are provided on opposite sides of flange 52 and extend parallel to each other permitting the end cover to be adjusted transversely in a horizontal direction. A lens tube 78 is mounted in a bore formed in the combined end cover 75 and lamp house 74, and is adapted to be locked in any adjusted position by a set screw 79. Lens tube 78 has mounted therein a condenser lens 80 and a slit member 81 having a horizontally extending slit therein. A second lens tube 82, co-axial with the tube 78, is securely fitted in a sleeve 83 removably mounted in a bore formed in an end member 84 which is secured to the end cover 75 by screws 85. The lens tube 82 may be locked in different positions relative to the tube 78 by a set screw 86.

A prism 88 suitably mounted in a prism holder 89 is provided at the front of the lens tube 82 to deflect a beam of light passing through the tube 82 at right angles thereto and onto the films N and P at the center of their arcuate contact with the drum unit 16. The prism holder 89 has a bore therein fitted over the reduced forward end of the tube 82 and is adapted to be locked in different positions thereon by a set screw 90. A set of objective lenses 91 is provided at the forward end of the tube 82 to focus the illuminated slit of member 81 onto the films N and P in the form of a fine horizontal slit of light. It has been found that when the beam of light impinging on the films is very narrow, on the order of .010 inch, the best results are obtained. In any event, the length of the slit in member 81 is such that the beam of light striking the films extends slightly over the adjacent ends of the sprocket 36 and ring 45.

It will be noted the entire optical system, including the lamp 73, lens tubes 78 and 82 and prism 88 are all carried by the end cover 75. Thus, the printing light beam may be accurately focused on the films N and P by loosening the screws 76 and moving the end cover 75 transversely until the beam is accurately focused, whereupon the cover 75 may be locked in place. This focusing feature as well as the general arrangement of the optical system and prism is disclosed and claimed in the co-pending application of Albert W. Tondreau, Serial No. 230,523, filed September 17, 1938.

When the optical system is to be removed for cleaning or repair, or whenever it is desired to gain access to the interior of the printing compartment, the bearing member 65 is moved rearwardly, causing the gears 57 and 58 to be withdrawn from the opening 70 while the screws 50 are withdrawn, allowing the sleeve 49, carrying the ring 45 and entire optical system to be slid out of the bore 42. Thus, the original adjustment of the various elements of the optical system relative to each other and to the ring 45 need not be disturbed. Furthermore, this provision insures accurate realignment of the optical system and ring 45 with the sprocket member 36 and other elements of the film driving system when the sleeve 49 is replaced in the bore 42. The bearing member 41 rotatably supporting the sprocket member 36 may likewise be removed from the bore 42 when the gear 58 is removed from mesh with the gear 59.

Referring now to Figs. 3, 4, 5 and 6, the films N and P are urged into intimate contact with each other on the drum unit 16 by a pad and gate device generally indicated at 94. This device comprises a pad member 95 pivotally mounted on a stud 96 secured in a boss 97 formed on the printer casing wall 44'. A web guiding spool 196 is rotatably mounted by ball bearings 197 on a stub shaft 98 secured at one end thereof to a lug 99 extending from member 95 by a screw 100. A second web guiding spool 101 is rotatably mounted by ball bearings 102 on a stub shaft 103 supported at the top of the member 95. Shaft 103 has an enlarged circular shoulder portion 104 formed thereon and adapted to engage the sides of a lug 105 extending from the top of member 95. A rectangular bearing portion 106 is formed on shaft 103 to the rear of shoulder 104 and is adapted to be guided in a guideway 107 formed in the lug 105. Shaft 103 is adapted to be locked into different positions along the guideway 107 by a screw 108 threaded in the bearing portion 106 and engaging a washer 109 which bridges the guideway 107 and engages the sides of lug 105. An adjusting screw 110 threaded in the lug 105 engages the under surface of the bearing portion 106 of shaft 103 to permit adjustment of the spool 101 toward and away from the spool 196. An endless fabric web 112 is looped over the spools 196 and 101 and is held from transverse movement on the spools by flanges 113 formed on the ends of each of the spools. The tautness of the web 112 may be varied by adjustment of screw 110. A guard 114 is secured to the member 95 to protect the web 112 from injury.

Member 95 has a depending lug 115 formed thereon which is pivotally connected by means of a pin 116 to a plunger rod 117, the lower end of which is fitted within a cylindrical sleeve 118 having a lug 119 extending thereon and pivoted on a bolt 120 threaded in the casing wall 44' of the printer casing. A compression spring 121 is interposed between the sleeve 118 and a shoulder 122 integrally formed on the plunger 117 to urge the plunger 117 upwardly. Plunger 117 urges the gate member 95 in a clockwise direction to engage the web 112 against the films N and P on the sprocket 36 and ring 45 to hold the same in intimate contact during their passage past the printing light beam. A set screw 123 (Figs. 3 and 6) is threaded in the gate member 95 and abuts the protuberance 43 to limit the inward movement of the member 95. The innermost position of the member 95 may thus be adjusted by adjustment of screw 123. By drawing the member 95 outwardly away from the drum unit 16 into a position wherein the pin 116 passes across a line extending between the stub shaft 96 and the bolt 120, the member 95 will be urged into an open or threading position by the spring 121.

It will be seen from the above that by adjustment of the screws 110 and 123 the arc of contact of the web 112, as well as the pressure produced thereby on the films N and P, may be varied as desired. Since a comparatively long arc of contact is obtainable between the web 112 and the films, it will be seen that an intimate engagement may be effected between the two films. Thus any air which may be lodged between the two films forming "blisters" or air pockets will be ironed out in advance of the printing point.

Referring to Fig. 6, the weighted roller 14 adapted to tension the negative film N between the sprocket 13 and drum unit 16 is rotatably mounted on a stub shaft 124 extending from a weighted arm 125 which is pivotally mounted on a stub shaft 126 extending from the printer casing wall 44' and forming a bearing for the guide roller 15. The weighted roller 27 for tensioning the positive film P intermediate the sprocket 13 and the drum unit 16 is similarly journalled on a stub shaft 127 extending from a weighted arm 128 which is pivotally mounted on a stub shaft 129 extending from the printer casing wall 44' and forming a bearing for the guide roller 28. The guide roller 28 is so positioned as to lead the film P into contact with the film N at an angle of approximately 3°. A guide plate 130 suitably secured in the opening 131 formed in the cylindrical protuberance 43 lies parallel to the path of the film N extending between the roller 15 and the drum unit 16 to guide the film N. A similar guide plate 132 is secured at the bottom of the opening 131 to guide the film N between the drum unit 16 and the lower weighted roller 17.

The weighted roller 17 for tensioning the film N intermediate the drum unit 16 and the lower sprocket 18 is rotatably mounted on a stub shaft 133 extending from an arm 134 which is pivoted at 135 to the wall 44'.

The weighted roller 29 for tensioning the film P intermediate the drum unit 16 and the sprocket 32 is journalled on a stub shaft 136 provided on the end of an arm 138 which is fixed on a shaft 139 journalled in a bearing formed in the wall 44'. A weighted arm 140 is also secured on the shaft 139 to urge the roller 29 downwardly in a clockwise direction.

The rollers 17 and 29 are so positioned that they lead the films N and P, respectively, from the drum unit 16 at a slight angle, preferably 1½° apart. Also, the arms 134 and 138 rotatably supporting the rollers 17 and 29, respectively, are so positioned during the threading of the films that a line passing between the pivotal support of each arm and the shaft for its respective roller extends perpendicular to the path of the film which extends between the drum unit 16 and the surface of that roller.

The rollers 14 and 17 are so weighted that a drag of approximately one-half pound is applied to the driving edges of the sprocket teeth 38 of sprocket member 36 by the leading edges of the sprocket perforations of film N. To accomplish this, the arm 125 is preferably so weighted as to cause the roller 14 to exert approximately a one pound tension upwardly on the film N while the roller 17 and arm 134 are so weighted as to exert a one-half pound tension downwardly on film N. This distribution of weights is sufficient to cause a good contact between the film N and the sprocket 36 and ring 45 while at the same time causing sufficient drag on the teeth 38 to continually form a driving engagement between the teeth and the film. Further, this drag is insufficient to cause a strain on the film, especially the sprocket perforations, by the sprocket teeth 38.

Approximately a one-half pound drag on the driving edges of the sprocket teeth 38 is also applied by the leading edges of the sprocket perforations of the film P. This is preferably accomplished by weighting the arm 128 to cause the roller 27 to exert approximately a two and one-half pound tension upwardly on film P while the roller 29 is so weighted by the weight 140 as to exert approximately a tension of two pounds downwardly on film P. Since the film P is wrapped over the film N at the printing point, the tension applied thereto not only establishes an intimate contact between the two films but also aids in forming an intimate contact between film N and the surfaces of the sprocket member 36 and ring 45.

Due to the fact that the films N and P are led in an arc over the spaced members 36 and 45, the tension applied thereto will create a lateral stiffness in the films while passing the printing point. Although this tension applied to the films is considerable the drag upon the driving edges of the sprocket teeth 38 is only sufficient to cause a driving effort to be exerted by these teeth on the leading edges of the sprocket perforations of the films as they pass over the drum unit, thereby reducing the tendency of the sprocket teeth to tear or wear the perforations of the films. Since the driving edges of the sprocket teeth are always in contact with the leading edges of the sprocket perforations of both films, the teeth will tend to prevent any relative slippage between the two films as they are being printed.

Due to the reduced drag on the sprocket teeth 38 by the films, the tendency for "sprocket ripple" or minute variations in speed occurring in rapid succession (caused by the various film perforations sliding unevenly off of the engaging surfaces of the respective sprocket teeth, or by microscopic ridges on the engaging surfaces of the sprocket teeth which catch the perforations) will be materially reduced. The reduction of such sprocket ripple is very important, especially at a point closely adjacent the printing point, since the ripple tends to set up a chattering or uneven pull on the films and if permitted to travel along the film to the printing point, would cause an undesired sound record or "distortion" to be recorded on the film P.

The sprocket ripple caused by the passage of the heavily tensioned film P over the teeth of sprockets 13 and 32 is prevented to a large extent from being transmitted along the film P to the printing point by the provision of the sinuous paths in this film above and below the printing drum unit 16. These sinuous paths greatly increase the length of the film between the sprockets and printing point and consequently allow the cellulose film, due to its resiliency, to absorb these sprocket ripples. Furthermore, by causing the film to travel over and rotate the various rollers 25, 26, 27, 30 and 31 a certain amount of the sprocket ripple is absorbed by the inertia of these rollers which tends to resist any small, quick variation in speed.

Figure 2:
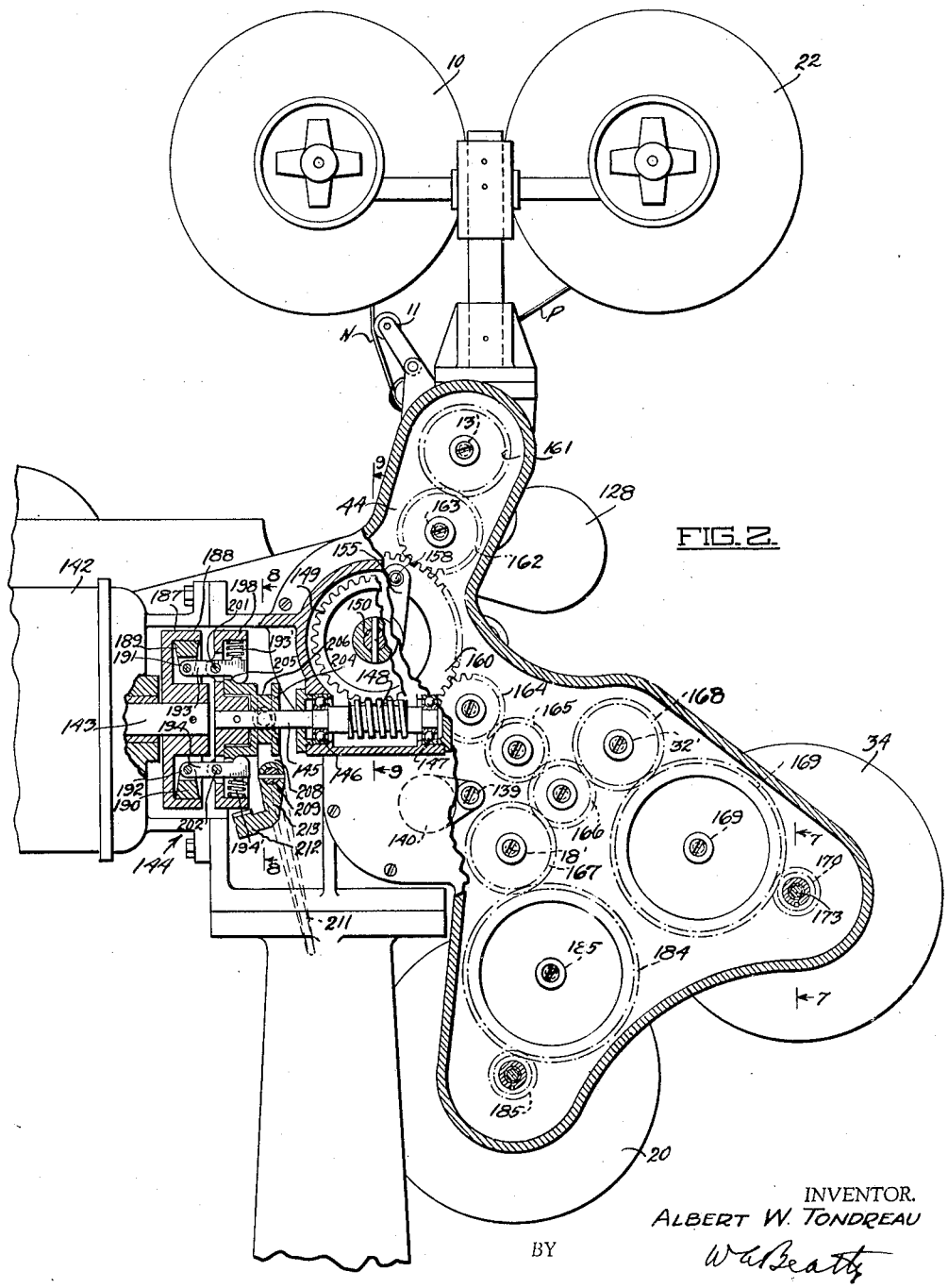
Fig. 2 is a rear elevational view, with parts in section, of the printing apparatus.

Referring to Figs. 2, and 9, the various sprockets and take-up reels are driven from a single motor 142 mounted at the rear of the printer casing 44. The drive shaft 143 of motor 142 is connected by means of a clutch generally indicated at 144 to a shaft 145 rotatably mounted in ball bearings 146 and 147 and having formed thereon a worm 148. Worm 148 meshes with a worm gear 149 secured on a stub shaft 150 which is journalled in bearings 151 and 152. Bearing 152 is formed in a bell member 153 suitably secured over an opening formed in the rear wall 44'' of casing 44. The bearing 151 is formed in a cover plate 154 suitably secured over an opening formed in a gear compartment provided in the bell 153. A spider 155 is suitably secured on the inner end of the stub shaft 150 and has a pair of diametrically opposed fiber bushings 156 and 157 formed in bores extending therethrough. These bushings receive studs 158 and 159, respectively, secured on a gear 160 which is secured on the end of the drive shaft 37 which drives the sprocket member 36 of the printer drum unit 16.

The shaft 13' of the feed sprocket 13 has a gear 161 secured thereon, in the casing 44, which is driven from the gear 160 through an idler gear 162 which is journalled on a stub shaft 163 extending from casing wall 44. The sprocket shafts 18' and 32' of the sprockets 18 and 32, respectively, have gears 167 and 168, respectively, secured thereon which are also driven from the gear 160 through intermediate idler gears 164, 165 and 166. These various gears 160, 161, 162, 164, 165, 166, 167 and 168 are of such diameters that the same peripheral velocity is applied to the various sprockets 13, 18, 32 and 36.

Gear 168 meshes with an idler gear 169 journalled on a stub shaft 169' extending from the casing wall 44' to transmit motion to a take-up reel gear 170.

Referring to Fig. 7, the gear 170 is keyed on the hub of a disc member 171 journalled on a sleeve 172 fitted over a reel shaft 173 on which is integrally formed the hub of reel 34. Shaft 173 is rotatably mounted in ball bearings 174 mounted in a sleeve 175 which is removably fitted in a bore formed in the front casing wall 44' of the printer casing 44. The disc member 171 forms part of a slip clutch generally indicated at 176 and engages a friction disc 177. A disc 178 engages the opposite side of the disc 177 and is slidably keyed at 179 to a hub 180 which is keyed to the reel shaft 173. A leaf spring 181, semi-circular in shape, has an aperture 182 centrally located therein and fitted over the threaded end of shaft 173. Leaf spring 181 engages at the ends thereof diametrically opposed portions of the disc 178 to urge the same into frictional contact with disc 177 which, in turn, frictionally engages disc member 171 to obtain a non-positive driving connection between the gear 170 and the shaft 173. A nut 183 threaded on shaft 173 engages the leaf spring 181 and when moved along shaft 173 varies the driving torque between the gear 170 and shaft 173.

The gear 167 (Fig. 2) meshes with an idler gear 184 journalled on a stub shaft 185 extending from the casing wall 44'. Gear 184 meshes with a second take-up reel drive gear 185 for driving the take-up reel 34. A slip clutch (not shown) identical with that of 176 (Fig. 7) is provided to transmit rotation from the gear 185 to the reel 20.

Referring to Figs. 2 and 8, the clutch 144 comprises a drum 187 suitably secured on the motor shaft 143. Drum 187 has a cylindrical flange 188 formed thereon and adapted to be engaged on the inner surface thereof by a pair of diametrically opposed friction shoes 189 and 190. Shoes 189 and 190 are pivotally connected at 191 and 192, respectively, to the ends of levers 193 and 194, respectively. Levers 193 and 194 are mounted intermediate their ends on pins 201 and 202, respectively, mounted on a disc member 198 which is secured on the shaft 145. The levers 193 and 194 are urged by springs 193' and 194' to cause their respective shoes 189 and 190 to engage the drum 187 to transmit rotation from the motor shaft 143 to the shaft 145 through the disc member 198. The rear ends of the levers 193 and 194 have semi-circular bearing surfaces formed thereon which ride on the periphery of a sleeve member 204 freely movable on the shaft 145. Sleeve 204 has a raised portion 205 formed at one end thereof and extending around the circumference thereof. A groove 206 is formed in the member 204, in which rides a pair of diametrically opposed pins 207 extending inwardly from the opposite ends of a yoke member 208. Yoke 208 is secured on a control shaft 209 journalled in a bearing 210 (Fig. 8) formed in the casing wall 44'. Yoke 208 is moved by a control lever 211 (Fig. 1) provided at the front of the machine. A brake shoe 212 is supported from the yoke member 208 by a bracket 213 and is positioned so as to engage the periphery of the member 198 when the clutch 144 is disengaged.

When the handle 211 is thrown to the left (Fig. 2) the yoke member 208 causes the sleeve 204 to be moved to the right forcing the semi-circular bearing surfaces of the levers 193 and 194 onto the periphery of the enlarged portion 205 of sleeve 208 against the action of the springs 193' and 194' to disengage the clutch shoes 189 and 190. Simultaneously the brake shoe 212 engages the periphery of member 198 to arrest the rotation of member 198 and the entire printing mechanism. This provision permits the entire printing mechanism to be stopped and started in a very short time.

While the ring 45 is preferably driven from the sprocket member through the train of gears 56, 57, 58 and 59, these gears may be omitted, in which case ring 45 would be driven through the films N and P due to the inward pressure applied thereto by the pad device 94 and by the weighted rollers 14, 17, 27 and 29.

In the event that it is desired to reduce the friction caused by the relatively large diameters of the engaging bearing surfaces of rings 45 and 47, the optical assembly tubes 78 and 82 may be arranged co-axial of the sprocket shaft 37. In this case, the diameters of the bearing surfaces of rings 45 and 47 may be materially reduced.

Although I have described my invention in detail and therefore have utilized certain specific terms herein, it is to be understood that the present disclosure is illustrative rather than restrictive and that changes and modifications may be resorted to without departing from the spirit of the following claims.

I claim:

1. In a film printing apparatus, the combination of a casing, means in said casing forming a cylindrical bearing, an annular film guiding member journalled in said bearing and adapted to guide a film over the periphery thereof, said member having an axial opening extending from one side thereof to the other, a portion of said film overhanging one side of said member, a light source on the opposite side of said member, and an optical unit extending through said opening and inside of said bearing for transmitting light from said light source to said overhanging portion of said film.

2. The combination according to claim 1 comprising means other than said film for rotating said member.

3. In a film printing apparatus, the combination of a casing, a film drum adapted to guide a film over the periphery thereof with a portion of said film overhanging said drum, means rotatably supporting said drum in said casing, means in said casing forming a cylindrical bearing, an annular film guiding member having a sleeve journalled in said bearing and adapted to guide said overhanging portion of said film over the periphery thereof, said member being spaced from said drum, and means comprising light transmitting means extending through said sleeve for light impressing said film intermediate said member and said drum.

4. The combination according to claim 3 comprising means other than said film for driving said member and said drum in synchronism.

5. In a film printing apparatus, the combination of means forming a cylindrical bearing, an annular film guiding member journalled in said bearing and adapted to guide a film over the periphery thereof and in overhanging relation thereto, an annular gear on said member and concentric therewith, a drive gear meshing with said annular gear for rotating said member and said gear, and light transmitting means extending through said annular gear and said member for light impressing the overhanging portion of said film.

6. In a film printing apparatus, the combination of a casing, means in said casing forming a cylindrical bearing, an annular film guiding member journalled in said bearing and adapted to guide a film over the periphery thereof in overhanging relation thereto, said member having a shoulder thereon engaging one end of said bearing, an annular gear member secured on said member, said gear member forming a shoulder engaging the opposite end of said bearing to prevent endwise movement of said film guiding member, a drive gear meshing with said gear member and adapted to rotate said member, and a light transmitting unit extending through said member for light impressing the overhanging portion of said film.

7. In a film printing apparatus, a casing having a bore therein, a sleeve removably fitted in said bore, a sleeve bearing in said sleeve, an annular film guiding member journalled in said bearing and adapted to guide a film thereover, an optical assembly unit extending through said sleeve bearing and adapted to transmit light to said film, and means on said sleeve supporting said unit.

8. In a film printing apparatus, the combination of a casing having a bore therein, a sleeve removably fitted in said bore, a sleeve bearing in said sleeve, an annular film guiding member journalled in said bearing and adapted to guide a film thereover, an optical assembly unit extending through said sleeve bearing and adapted to transmit light to said film, a supporting member for said unit, and adjustable means for securing said supporting member in different positions on said sleeve to change the position of said unit relative to said film.

9. In a film printing apparatus, the combination of a casing having a bore therein, a film drum adapted to guide a film over the periphery thereof with a portion of said film overhanging said drum, means rotatably supporting said drum in said bore, a sleeve removably fitted in said bore, a hollow bearing in said sleeve, an annular film guiding member journalled in said bearing and spaced from said drum for guiding said overhanging portion of said film, an optical assembly unit extending through said bearing and adapted to transmit light to said film intermediate said drum and said member.

10. The combination according to claim 9 comprising means for rotating said drum and said member in synchronism.

11. Film printing apparatus comprising a rotatable drum adapted to guide a pair of films in contact thereover in printing relation on said drum, an optical system adapted to project an optical slit from a light source, said optical system being arranged with the axis thereof substantially parallel with the axis of said drum, a light deflector for deflecting said optical slit to a focus adjacent the surface of said drum, a mount for said optical system, and means whereby said mount may be adjusted transversely of the optical axis of said system to adjust said focus.

12. Film printing apparatus comprising a rotatable drum adapted to guide a pair of films in contact thereover in printing relation on said drum, an optical system adapted to project an optical slit from a light source, said optical system being arranged with the axis thereof substantially parallel with the axis of said drum, a light deflector for deflecting said optical slit to a focus adjacent the surface of said drum, said optical system having an optical axis portion extending lengthwise of the axis of said drum and means for deflecting another portion thereof radially of said drum to a printing point on said drum, and means for adjusting said first mentioned optical axis portion of said optical system parallel to itself to vary the length of said radial portion to adjust the focus of said optical slit at the printing point of said films on said drum.

ALBERT W. TONDREAU.